United States Patent
Fritsche

(10) Patent No.: US 10,123,671 B2
(45) Date of Patent: Nov. 13, 2018

(54) HAND-HELD PNEUMATIC VACUUM

(71) Applicant: The Boeing Company, Chicago, IL (US)

(72) Inventor: David L. Fritsche, St. Louis, MO (US)

(73) Assignee: The Boeing Company, Chicago, IL (US)

(*) Notice: Subject to any disclaimer, the term of this patent is extended or adjusted under 35 U.S.C. 154(b) by 874 days.

(21) Appl. No.: 14/284,977

(22) Filed: May 22, 2014

(65) Prior Publication Data

US 2015/0335217 A1 Nov. 26, 2015

(51) Int. Cl.
| | |
|---|---|
| *A47L 5/24* | (2006.01) |
| *B01D 46/00* | (2006.01) |
| *A47L 9/12* | (2006.01) |
| *A47L 5/16* | (2006.01) |
| *B01D 50/00* | (2006.01) |
| *A47L 5/18* | (2006.01) |

(52) U.S. Cl.
CPC ............. *A47L 5/24* (2013.01); *A47L 5/16* (2013.01); *A47L 5/18* (2013.01); *A47L 9/127* (2013.01); *B01D 46/0041* (2013.01); *B01D 50/002* (2013.01); *B01D 2279/55* (2013.01)

(58) Field of Classification Search
CPC ..... A47L 5/24; A47L 5/18; A47L 5/16; A47L 9/127; B01D 46/0041; B01D 50/002; B01D 2279/55
USPC ........................ 15/344; 55/486, 487, 337, 418
See application file for complete search history.

(56) References Cited

U.S. PATENT DOCUMENTS

| | | | | |
|---|---|---|---|---|
| 2,913,120 | A * | 11/1959 | Glasby, Jr. ........... | A47L 5/18 210/406 |
| 3,032,954 | A * | 5/1962 | Racklyeft ............ | A47L 5/38 55/282 |
| 3,921,250 | A * | 11/1975 | Jerabek ............... | A47L 9/102 15/353 |
| 4,726,825 | A * | 2/1988 | Natale ................ | A47L 9/102 55/318 |

(Continued)

FOREIGN PATENT DOCUMENTS

WO 2012/058720 A1 5/2012

OTHER PUBLICATIONS

"80-201 Compressed Air Handheld Vacuum Tool", Ace Industrial Products, pp. 1-2, http://aceindustrialproducts.com/.

(Continued)

*Primary Examiner* — Bryan R Muller
(74) *Attorney, Agent, or Firm* — Miller, Matthias & Hull LLP

(57) ABSTRACT

A portable pneumatic vacuum cleaner is disclosed that includes a venturi vacuum generator disposed downstream of a primary filter. The primary filter is disposed in filter chamber that is disposed downstream of a collection chamber. Both chambers are disposed in a canister and the collection chamber is separated from the filter chamber by a partition filter. A vacuum conduit extends through a wall of the canister and into the collection chamber and has a collection end positioned tangentially to the wall of the canister for generating cyclonic flow in the collection chamber. The filter chamber is connected to the vacuum generator by an outlet conduit. The vacuum generator also connects to a pressurized air source and an exhaust.

19 Claims, 5 Drawing Sheets

(56) References Cited

U.S. PATENT DOCUMENTS

| | | | | |
|---|---|---|---|---|
| 4,731,101 | A | * | 3/1988 | Kanda ............... A47L 9/1666 |
| | | | | 55/323 |
| 5,050,264 | A | * | 9/1991 | Breslin ............... A47L 5/365 |
| | | | | 15/314 |
| 5,142,730 | A | * | 9/1992 | Braks ............... A47L 7/0028 |
| | | | | 15/314 |
| 6,152,996 | A | * | 11/2000 | Linnersten ......... B01D 46/0024 |
| | | | | 55/385.3 |
| 6,561,769 | B1 | | 5/2003 | Tell |
| 7,676,965 | B1 | | 3/2010 | Nathenson et al. |
| 2013/0232723 | A1 | | 9/2013 | Catalfamo |

OTHER PUBLICATIONS

"627-12H Hepa Filter for WH-105 / WH-115", Clayton, p. 1, www.jclayton.com/Home/BrowseProduct.asp?DeptID=127&ProductNo=627-12H.

"DC515K 18V Cordless ½ Gallon Wet/Dry Portable Vac", DeWalt Guaranteed Tough, p. 1, www.dewalt.com/tools/cordless-specialty-cordless-vacuums-dc515kaspx.

Guardair, "Air Sheild—Pistol Grip Safety Air Guns", Aug. 16, 2013, pp. 1-22, www.westernsafety.com/guardair2008/guardair.html.

\* cited by examiner

HAND-HELD PNEUMATIC VACUUM

FIELD

This disclosure relates to hand-held pneumatic vacuums. More specifically, this disclosure relates to hand-held pneumatic vacuums that provide HEPA filtering and that include a venturi vacuum generator disposed downstream of both a particle collection chamber and a filter chamber.

Background

Certain manufacturing processes require machining of metal components, which results in the creation of metal particles. Some of the metal particles are small enough to become airborne and inhaled, thereby presenting a health and safety hazard to workers. Further, coating the metal component with a primer prior to machining may produce metal particles coated with the primer and that are small enough to be inhaled. These particles may present a more serious health hazard, depending upon the particular primer used to coat the metal. For example, primers including hexavalent chromium are particularly hazardous. Further, regulations may require metal particles coated with hexavalent chromium to be collected using high efficiency particulate air (HEPA) grade filtration systems, such as HEPA vacuum cleaners.

At least two types of HEPA vacuum cleaners for use in manufacturing facilities are known. A first type is an electric hand-held shop vacuum that either plugs in to a power supply or includes a battery pack. Such HEPA vacuum cleaners include an impeller or a fan that creates a low-pressure (i.e., a vacuum) region to collect debris. However, for plug-in type HEPA vacuums, the power cord can be an annoyance and a tripping hazard. For battery-operated HEPA vacuums, if the battery pack is not properly charged, the vacuum cleaner may not be available when needed. Further, the impeller or fan adds weight and complexity to the HEPA vacuum. The impeller/fan may also be damaged by the environmental conditions of the manufacturing facility, thereby shortening the useful life of the HEPA vacuum.

A second type of HEPA vacuum for use in manufacturing facilities is also hand-held, but is pneumatically powered and includes a venturi vacuum generator (i.e., a "venturi") and a HEPA filter bag (e.g., a bag made from a HEPA filter media). The venturi connects a pressurized air source and a vacuum hose to an exhaust that flows into the HEPA filter bag. Pneumatically powered HEPA vacuums do not include an impeller, a fan or a power source. Instead, the pressurized air flowing through the venturi creates a low-pressure region at the vacuum hose. During use, the pressurized air and air drawn-in through the vacuum hose both flow through the exhaust and into the HEPA filter bag. However, the exhaust has a relatively high flow rate and may damage the HEPA filter bag during use. For example, HEPA filter bags typically include ultrasonically welded seams that are prone to failure or leakage when exposed to high flow rates. When a HEPA filter bag is damaged, the particles collected in the HEPA filter bag can be blown out of the filter bag, into the air and onto surfaces surrounding the operator, thereby creating a health or safety hazard.

Larger pneumatic vacuums that provide HEPA filtering are also known. One variety is known as "drum top" vacuums, which generally consist of a lid mounted on top of a drum, which serves as a dust/dirt collection chamber. The lid supports a venturi vacuum generator. The venturi includes a pressurized air inlet, an exhaust and a vacuum inlet. The pressurized air flows from the pressurized air inlet through the venturi to the exhaust, which causes a low pressure or vacuum region at the vacuum inlet, causing air and particles to be drawn-in through the vacuum inlet. The vacuum inlet is disposed inside of a HEPA filter, which is disposed inside the drum. An additional vacuum hose connects to the drum, so that air drawn in through the vacuum hose, passes through the HEPA filter, before entering the vacuum inlet and exiting through the exhaust. The exhaust may include a silencer or a diffuser for noise suppression. However, drum top vacuums are large and bulky and do not provide the mobility of a hand-held vacuum. Therefore, drum top vacuums are not particularly useful for cleaning workstations in a manufacturing setting where metal is being machined.

Thus, there is a need for a hand-held HEPA vacuum that overcomes the disadvantages described above.

SUMMARY OF THE DISCLOSURE

In one aspect, a vacuum is disclosed that includes a canister that has a collection end and a filter end. Further, the canister has a continuous sidewall that connects the collection end to the filter end. The continuous sidewall has an inner surface connected to a partition wall. The partition wall includes an opening coupled to a partition filter. The partition wall and the partition filter divides the canister into a collection chamber disposed between the partition wall and the collection end of the canister as well as a filter chamber disposed between the partition wall and the filter end of the canister. The canister couples to a vacuum conduit having a collection end. The vacuum conduit passes through the continuous sidewall of the container with the collection end disposed tangentially along the inner surface of the continuous sidewall in the collection chamber. The canister also connects to an outlet conduit having a filter end connected to the filter chamber and a venturi end connected to a venturi housing. The filter chamber accommodates a primary filter. The venturi housing provides communication between the venturi end of the outlet conduit, a pressurized air source and an exhaust.

In another aspect, a hand-held pneumatic HEPA vacuum for removing particles from a workspace is disclosed. The disclosed vacuum includes a canister having a collection end, a filter end and a continuous sidewall connecting the collection end to the filter end. The continuous sidewall has an inner surface connected to an annular partition wall. The partition wall includes a central opening that accommodates a partition filter. The partition wall and the partition filter divides the canister into a collection chamber disposed between a partition wall and the collection end of the canister and a filter chamber disposed between the partition wall and the filter end of the canister. The canister couples to a vacuum conduit that has an inlet end and a collection end. The vacuum conduit passes through the continuous sidewall of the canister with the collection end of the vacuum conduit disposed and directed tangentially along the inner surface of the continuous sidewall in the collection chamber. The canister also connects to an outlet conduit having a filter end connected to the filter chamber and a venturi end connected to a venturi vacuum generator. The filter chamber accommodates a HEPA filter. The venturi vacuum generator includes a venturi housing having a filtered air inlet connected to the venturi end of the conduit, a pressurized air inlet connecting the venturi housing to a pressurized air source, and an exhaust outlet in communication with both the filtered air inlet and the pressurized air inlet.

In yet another aspect, a method for removing particulate matter from a workspace is disclosed. The disclosed method includes positioning a venturi vacuum generator downstream of a HEPA filter that is disposed in a filter chamber of a canister. The venturi vacuum generator includes a filtered air inlet in communication with the filter chamber, a pressurized air inlet in communication with a source of pressurized air and an exhaust in communication with the filtered air inlet and the pressurized air inlet. The method further includes defining a collection chamber in the canister and upstream of the filter chamber. The method further includes separating the filter chamber from the collection chamber with a partition filter. The method further includes connecting the collection chamber to a vacuum conduit having a collection end so that the collection end extends tangentially into the collection chamber. Further, the method includes supplying pressurized air to the pressurized air inlet and directing pressurized air away from the filtered air inlet and towards the exhaust.

In any one or more of the embodiments described above, the partition filter engages an annular partition flange that has a central opening. The central opening couples to a tube that extends into the filter chamber. The primary filter is annular and includes an annular receiving flange that has an axial opening that receives the tube and that sealably engages the annular partition flange.

In a further refinement of this concept, the primary filter includes a distal end connected to distal cover. The distal cover connects to the annular receiving flange. The filter end of the canister is open and detachably connects to the filter end cap. The filter end cap may enclose the filter end of the canister and may bias the annular receiving flange against the annular partition flange.

In any one or more of the embodiments described above, the venturi housing includes a filtered air inlet connected to the venturi end of the outlet conduit. The venturi housing further includes a pressurized air inlet connected to the pressurized air source and an exhaust outlet connected to the exhaust. The pressurized air inlet is disposed between the filtered air inlet and the exhaust outlet. The venturi housing further includes a deflector for directing pressurized air away from the filtered air inlet and towards the exhaust outlet.

In any one or more of the embodiments described above, the collection end of the canister is open and detachably connected to a collection end cap that encloses the collection end of the canister. Further, the filter end of the canister is open and detachably connects to a filter end cap that encloses the filter end of the canister. The filter end cap may engage the primary filter and may bias the primary filter into a sealing engagement with the annular partition flange.

In any one or more of the embodiments described above, the venturi housing further includes an air shut-off valve for isolating the pressurized air source from the exhaust.

In any one or more of the embodiments described above, the primary filter is a HEPA filter.

In any one or more of the embodiments described above, the partition filter is a screen.

In any one or more of the embodiments described above, the collection end of the vacuum conduit may direct air and particles drawn in through the vacuum conduit tangentially along the inner surface of the continuous sidewall in the collection chamber.

In any one or more of the embodiments described above, the exhaust includes a muffler and/or a diffuser.

The features, functions, and advantages discussed herein is achieved independently in various embodiments or is combined in yet other embodiments, further details of which are provided in the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

Figure 1:
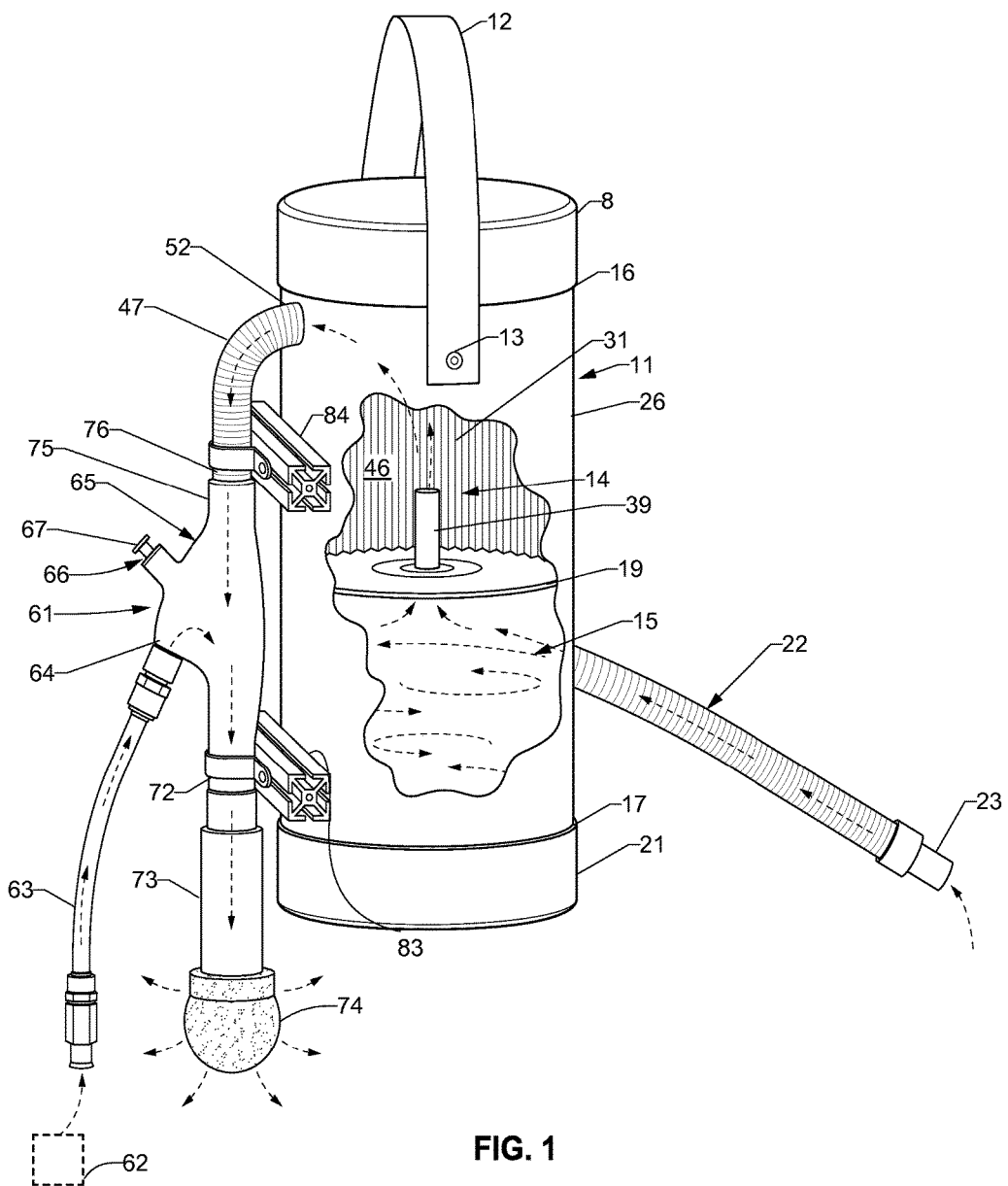
FIG. 1 is a perspective and partial sectional view of a disclosed hand-held pneumatic vacuum made in accordance with this disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive has been omitted. It should be understood, of course, that this disclosure is not limited to the particular embodiments illustrated herein.

DETAILED DESCRIPTION OF THE PRESENTLY PREFERRED EMBODIMENTS

A hand-held vacuum 10 is disclosed that is particularly useful in manufacturing environments where metal or primed metal is being machined. In brief summary, the vacuum 10 includes a canister 11 including a collection end 17, a filter end 16 and a continuous sidewall 26 connecting the collection end 17 to the filter end 16. The continuous sidewall 26 has an inner surface 25 connected to an annular partition wall 19. The annular partition wall 19 includes an opening 27 coupled to a partition filter 28. The annular partition wall 19 and the partition filter 28 divide the canister into a collection chamber 15 disposed between the annular partition wall 19 and the collection end 17 of the canister 11 and a filter chamber 14 disposed between the annular partition wall 19 and the filter end 16 of the canister 11. The canister 11 couples to a vacuum conduit 22 having a collection end 24. The vacuum conduit 22 passes through the continuous sidewall 26 of the canister 11 with the collection end 24 of the vacuum conduit 22 disposed tangentially along the inner surface 25 of the continuous sidewall 26 in the collection chamber 15. The canister 11 connects to an outlet conduit 47 having a filter end 52 connected to the filter chamber 14 and a venturi end 76 connected to a venturi housing 65. The filter chamber 14 accommodates a primary filter 31. The venturi housing 65 provides communication between the venturi end 76 of the outlet conduit 47, a pressurized air source 62 and an exhaust outlet 72.

As shown in FIG. 1, the canister 11 couples to a strap 12 that is in the form of a handle or a shoulder strap. As shown, the strap 12 secures to the canister 11 via one or more fasteners 13. Other means for attaching the strap 12 to the canister 11 will be apparent to those skilled in the art. A annular partition wall 19 divides the canister 11 into a filter chamber 14 and a collection chamber 15. Further, the canister 11 has a generally open filter end 16 and an open collection end 17. The open filter end 16 is covered by a filter end cap 18 and the open collection end 17 is covered by a collection end cap 21. The end caps 18, 21 need not be threadably connected to the filter and collection ends 16, 17 respectively, but instead may be secured to the filter and collection ends 16, 17 with a friction fit so they may be quickly and easily removed and replaced. In one embodiment, the filter and collection end caps 18, 21 are fabricated from a nylon material.

Figure 2:
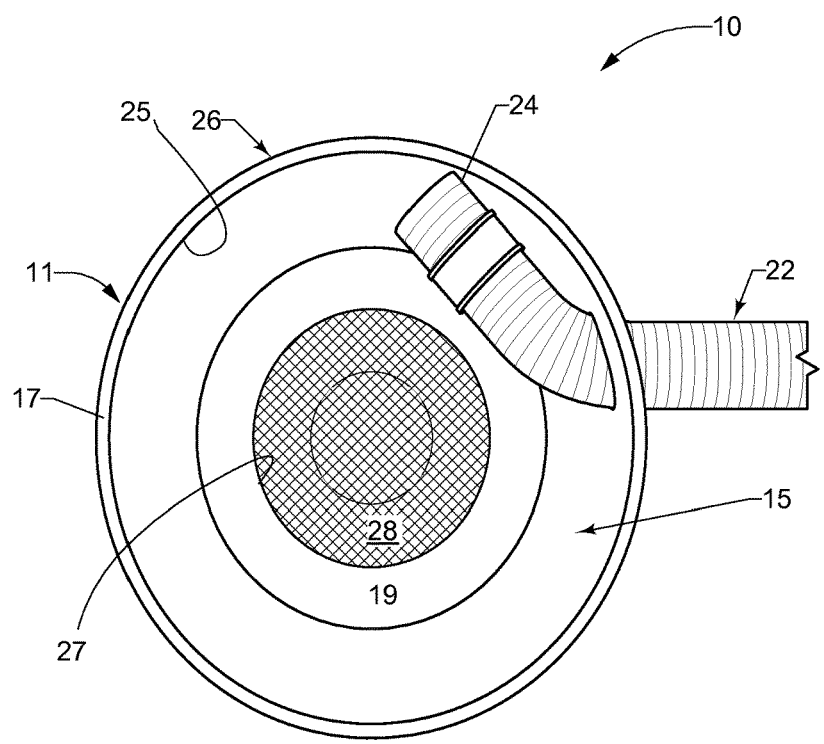
FIG. 2 is a partial bottom plan view of the vacuum shown in FIG. 1 illustrating the collection end of the vacuum conduit disposed in the collection chamber of the vacuum and positioned tangentially along the inner surface of the continuous sidewall for promoting cyclonic flow in the collection chamber.

FIG. 1 also illustrates a vacuum conduit 22 that has an inlet end 23 and a collection end 24 that is disposed within the collection chamber 15 as shown in FIG. 2. Returning to FIG. 1, the collection chamber 15 provides a space for removing large particles from the flow entering the collection chamber 15 through the vacuum conduit 22. Large particles will not become airborne in normal manufacturing environments and therefore can be collected in the collection chamber 15 without flowing through the filter chamber 14. Turning back to FIG. 2, such large particles are collected in the collection chamber 15 at least in part by positioning the collection end 24 of the vacuum conduit 22 in a tangential relationship to the inner surface 25 of the continuous sidewall 26 of the canister 11. Positioning the collection end 24 of the vacuum conduit 22 in a tangential relationship to the inner surface 25 creates a cyclonic flow within the collection chamber 15 as illustrated schematically in FIGS. 1, 4 and 5. The cyclonic flow forces large particles against the inner surface 25 of the continuous sidewall 26 and eventually causes the large particles to drop downwards towards the collection end cap 21 (see FIGS. 1 and 5).

Referring back to FIG. 2, the annular partition wall 19 separates the collection chamber 15 from the filter chamber 14. The annular partition wall 19 includes an opening 27 that couples to a partition filter 28. In one embodiment, the partition filter 28 is a screen. In a further refinement, the partition filter 28 is selected so that it has a mesh size appropriate for blocking large particles that do not need to be filtered or large particles that do not present an airborne health hazard. The mesh size of the partition filter 28 may vary, depending upon the particular application. For example, if the particles are generated by machining a material having a very high density, a smaller mesh size is selected for the partition filter 28. However, if the material being machined is light or has a low density, a larger mesh size is selected.

Figure 3:
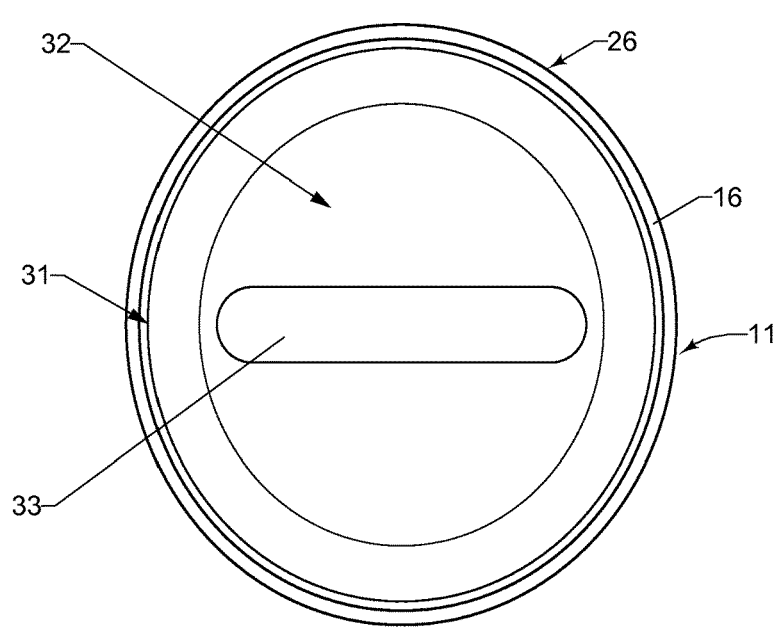
FIG. 3 is a partial top plan view of the vacuum shown in FIGS. 1 and 2 with a filter cartridge disposed in the filter chamber.

FIG. 3 is a top view of the vacuum 10 illustrating the filter end 16 of the continuous sidewall 26 of the canister 11. The filter chamber 14 (see FIG. 1) accommodates a primary filter 31. Many applications may require that the primary filter 31 be a HEPA filter. Typically, the primary filter 31 includes a distal cover 32 with a raised rib 33. The raised rib 33 may serve two functions, one of which is to serve as a handle or a grip for removing the primary filter 31 from the filter chamber 14. Another purpose for the raised rib 33 is illustrated in FIG. 4.

Figure 4:
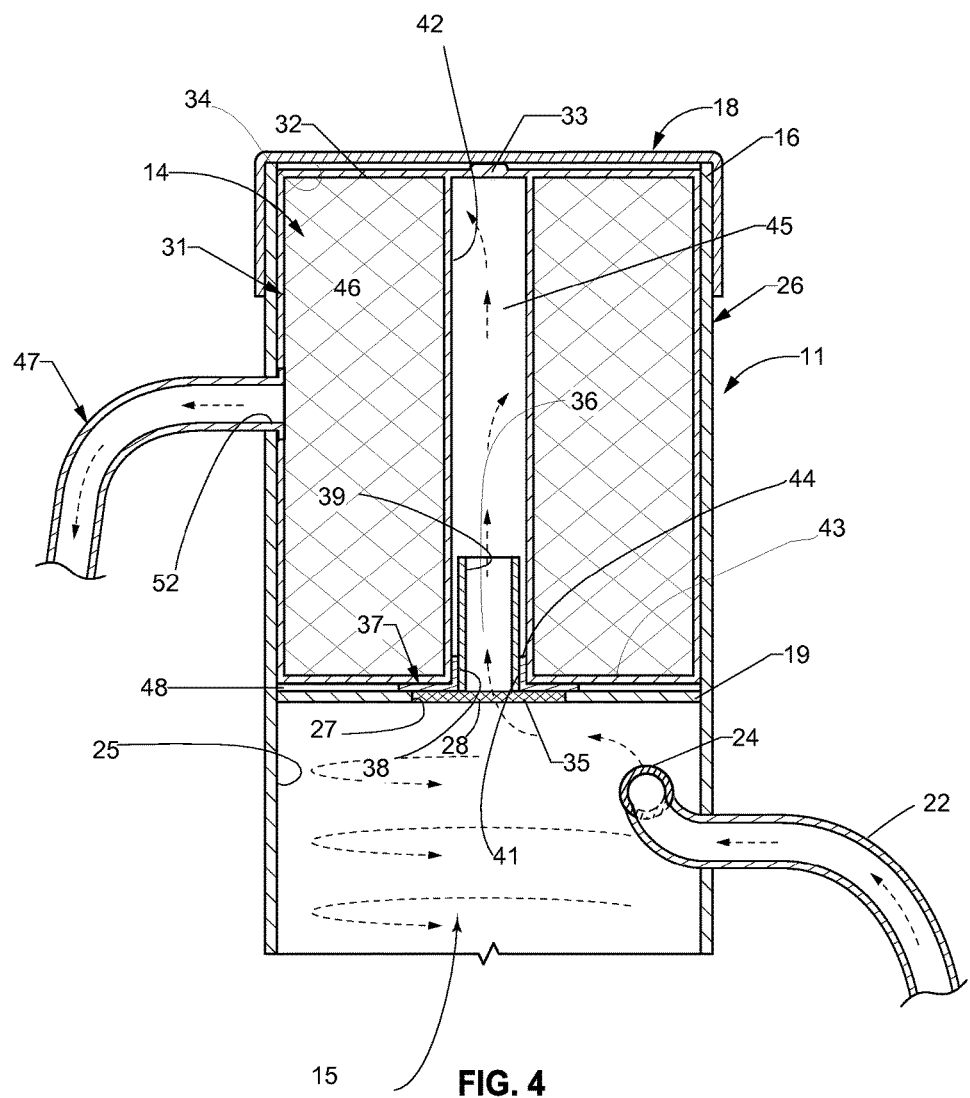
FIG. 4 is a partial sectional view of the vacuum shown in FIGS. 1-3, partially illustrating the flow through the vacuum conduit, into the collection chamber, through the partition filter and into the filter chamber, through the filter and out through the outlet conduit.

Specifically, as shown in FIG. 4, the filter end cap 18 mateably receives the filter end 16 of the canister 11 or the continuous sidewall 26. When the filter end cap 18 is pressed downwards over the filter end 16 of the canister 11, the inner wall 34 of the filter end cap 18 engages the raised rib 33. The raised rib 33 and distal cover 32 of the primary filter 31 are connected to the annular receiving flange 43 and central wall 42 as shown in FIG. 4. Thus, when the filter end cap 18 engages the raised rib 33, it biases the entire primary filter 31 downwards towards the annular partition wall 19.

As noted above, the annular partition wall 19 includes an opening 27 that accommodates the partition filter 28. The partition filter 28 includes a collection side 35 and a filter side 36. The filter side 36 of the partition filter 28 couples to or otherwise engages an annular partition flange 37 that has a central opening 38 that accommodates a tube 39. The tube 39 extends upwards through the axial opening 41 of the annular receiving flange 43 and into the primary filter 31, which has an annular configuration as shown in FIG. 4.

As noted above, the primary filter 31 includes a central wall 42 that connects the distal cover 32 to an annular receiving flange 43. To provide a seal between the annular receiving flange 43 and the annular partition flange 37, either a lower portion of the central wall 42 or the annular receiving flange 43 may sealably engage either the annular partition flange 37 or, more specifically, the upturned lip 44 of the annular partition flange 37. A suitable sealing material, such as a foam, polymeric material, etc. may be applied to the annular partition flange 37, the central wall 42 or the annular receiving flange 43 to effectuate a seal thereby forcing flow through the tube 39 and into the central opening 45 of the primary filter 31. Air and particles then flow through gaps (not shown) in the central wall 42 and through the filter media 46 of the primary filter 31 before exiting the filter chamber 14 through the outlet conduit 47 as shown in FIG. 4. Thus, little or no flow occurs through the gap 48 disposed between the annular receiving flange 43 and the annular partition wall 19. Instead, flow is directed through gaps or openings (not shown) in the central wall 42, through the filter media 46 and out through filter end 52 of the outlet conduit 47.

Figure 5:
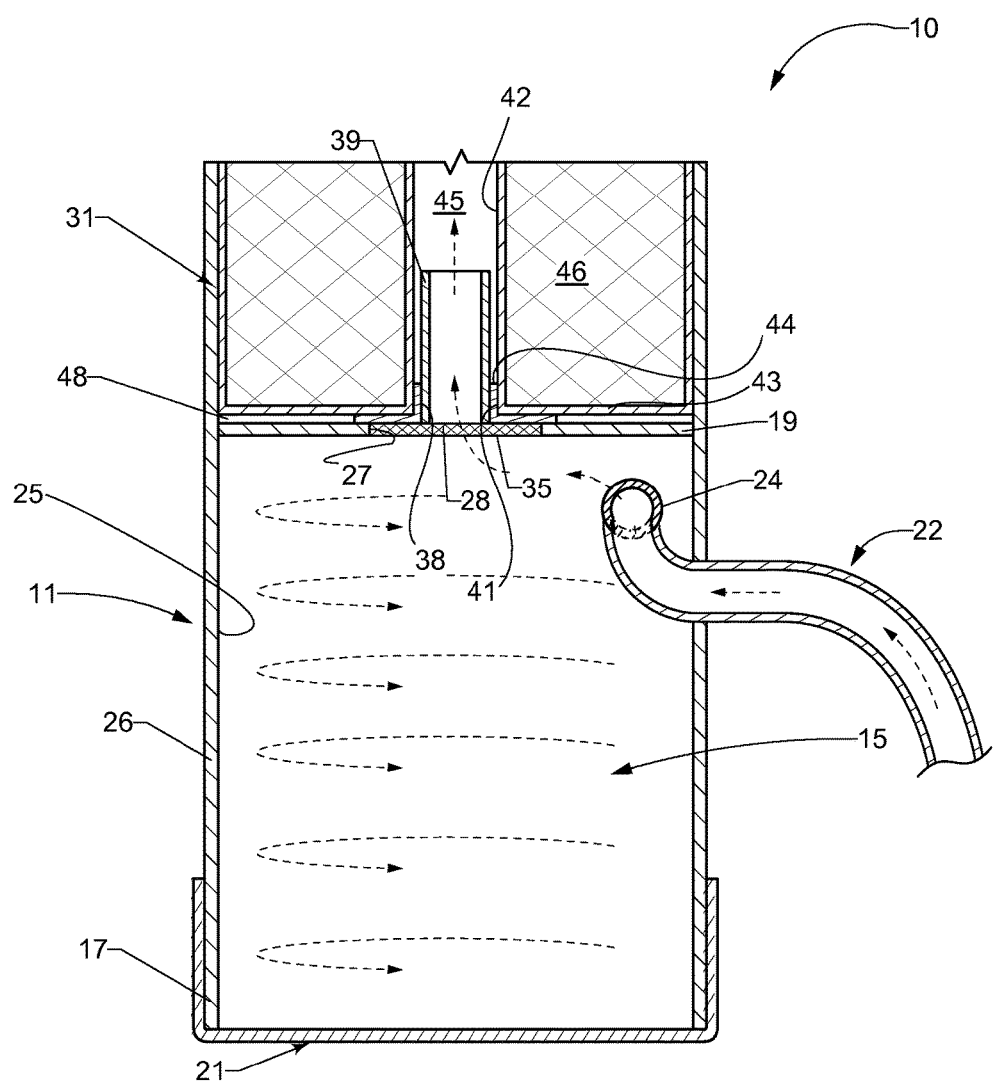
FIG. 5 is another partial sectional view of the vacuum cleaner illustrated in FIGS. 1-4, further illustrating the cyclonic flow in the collection chamber and the flow from the collection chamber to the filter chamber.

FIG. 5 illustrates the friction fit between the collection end cap 21 and the collection end 17 of the canister 11. FIG. 5 also illustrates the tangential flow out of the collection end 24 of the vacuum conduit 22 that generates the cyclonic flow within the collection chamber 15. Cyclonic flow is preferred to create centrifugal forces that throw larger particles against the inner surface 25 of the continuous sidewall 26 before the larger particles drop downwards towards the collection end cap 21. As noted above, larger particles, which are too large to become airborne and therefore an inhalation hazard, need not be passed through the filter media 46. The friction fit between the collection end cap 21 and the collection end 17 of the canister 11 enables larger particles to be easily removed from the collection chamber 15.

Figure 6:
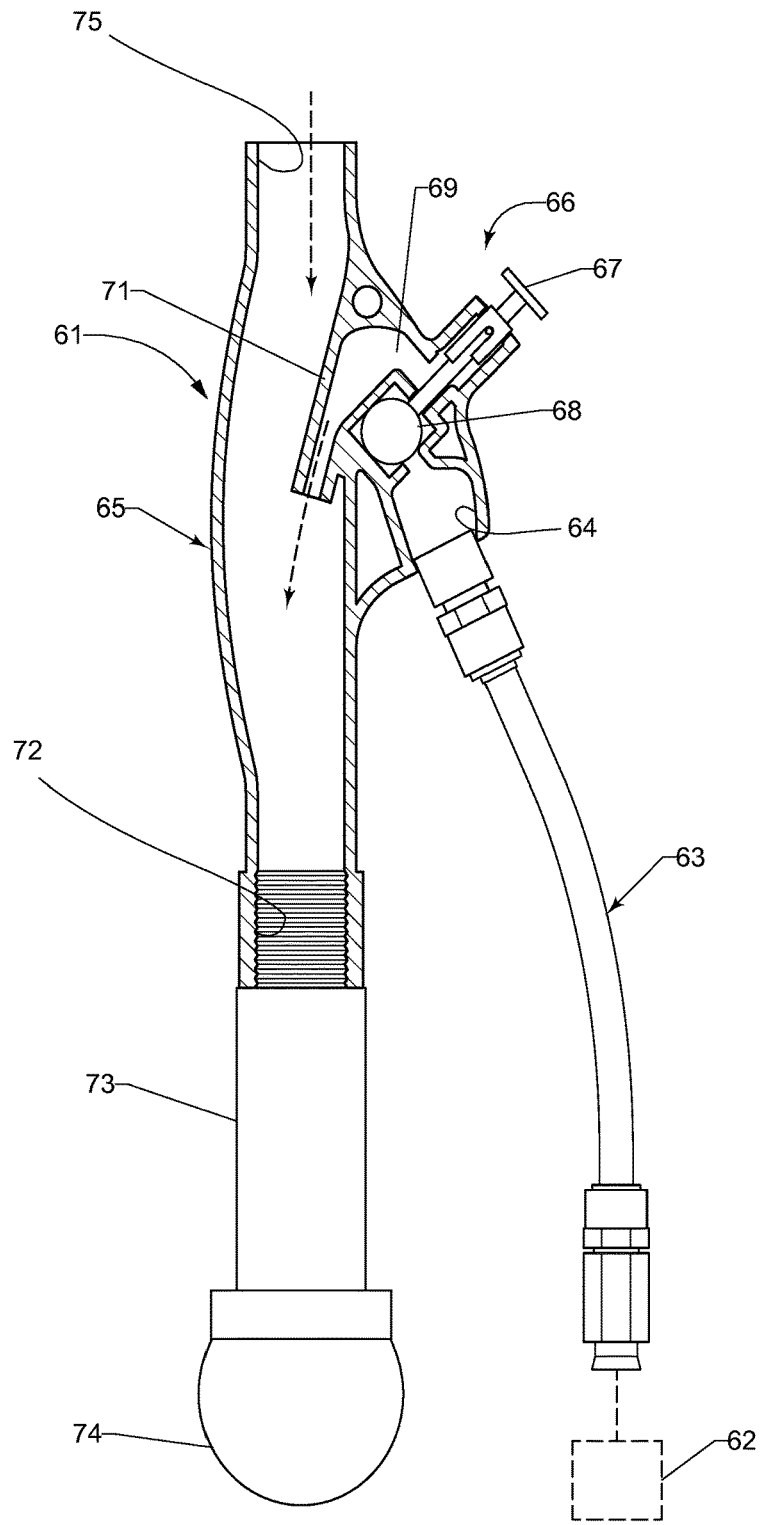
FIG. 6 is a sectional view of the venturi vacuum generator illustrated in FIG. 1, further illustrating the air shut-off valve and deflector for directing pressurized air away from the filtered air inlet and towards the exhaust outlet.

Turning to FIG. 6, the venturi vacuum generator 61 is disclosed. The venturi vacuum generator 61 generates a vacuum using known venturi principles. Pressurized air from a pressurized air source shown schematically at 62 in FIG. 6 passes through a pressurized air conduit 63 to a pressurized air inlet 64 of the venturi housing 65. The venturi housing 65 also includes an air shut-off valve 66, which is a poppet valve, a ball valve or other suitable valve known to those skilled in the art. The air shut-off valve 66 includes an actuator button 67 and a valve element 68. Pressurized air flows through the open valve element 68 into the chamber 69. The chamber 69 is bound by a deflecting wall 71 that directs the pressurized air downward in the orientation of FIG. 6 and towards the exhaust outlet 72. The exhaust outlet 72 connects to a muffler 73, which, in turn, connects to a diffuser 74. The pressurized airflow from the chamber 69 towards the exhaust outlet 72 creates a low-pressure zone or region near the filtered air inlet 75, which connects to the venturi end 76 of the outlet conduit 47 as best seen in FIG. 1. Thus, the low pressure in the region or zone near the filtered air inlet 75 creates a reduced pressure or a vacuum that pulls air and particles through the vacuum 10 as best illustrated in FIG. 1.

Returning to FIG. 1, pressurized air from the pressurized air source 62 is delivered to the pressurized air conduit 63, which delivers pressurized air to the pressurized air inlet 64 of the venturi housing 65. When the air shut-off valve 66 is open, pressurized air flows through the chamber 69 and along the deflecting wall 71 (see FIG. 6) before being directed towards the exhaust outlet 72. This flow of pressurized air creates a low-pressure zone or a vacuum in the venturi housing 65 near the filtered air inlet 75, which is communicated through the vacuum 10 all the way to the inlet end 23 of the vacuum conduit 22. Air and particles then flow through the vacuum conduit 22 and into the collection chamber 15. The collection end 24 of the vacuum conduit 22 is directed or aimed tangentially at the inner surface 25 of the continuous sidewall 26, which may create the cyclonic flow illustrated in FIGS. 1, 4 and 5. The cyclonic flow removes larger particles before the flow passes upward through the partition filter 28 and through the tube 39. Air and smaller particles then flow into the primary filter 31, through the filter media 46 and out through the filter end 52 of the outlet conduit 47. Filtered air then flows through the venturi end 76 of the outlet conduit 47 and into the venturi housing 65 before being entrained in the pressurized airflow and drawn out through the exhaust outlet 72, which is connected to a muffler 73 and/or a diffuser 74 for noise suppression. The combination of the muffler 73 and diffuser 74 provides good sound attenuation. The disclosed vacuum 10 is relatively quiet and does not pose a hazard to the hearing of nearby workers. In other words, the vacuum 10 will not contribute substantially to the noise pollution of the work environment. Further, the diffuser 74 dissipates and reduces the velocity of the exhaust flow, so the exhaust flow will not stir up metal dust or particles that have yet to be vacuumed. Thus, the use of the diffuser 74 avoids the problem of the exhaust flow from vacuum 10 generating new airborne metal particles.

The pressurized air source 62 may be an air compressor or other suitable source of pressurized air that is available in most manufacturing facilities. No electrical cord or battery pack is required. Further, to enhance the compact design of the vacuum 10, the venturi housing 65 is secured to the canister 11 by way of a bracket 83 and the outlet conduit 47 is secured to the canister 11 using a bracket 84.

INDUSTRIAL APPLICABILITY

A vacuum 10 is disclosed which may easily be carried with one hand while the operator directs the vacuum hose or vacuum conduit 22 with his or her other hand. The disclosed vacuum 10 is pneumatic or air-powered thereby eliminating the need for an electrical cord, a battery pack, a fan or an impeller. Hence, the disclosed vacuum 10 is light and easy to maneuver. The vacuum 10 includes a venturi vacuum generator 61 disposed downstream of a primary filter 31 which, in many applications, is a HEPA filter. The primary filter 31 is disposed in a filter chamber 14 that is disposed downstream of a collection chamber 15. The filter chamber 14 and collection chamber 15 are disposed in a common canister 11 and separated by an annular partition wall 19 that includes a partition filter 28 that prevents large particles from being drawn into the primary filter 31. The collection chamber 15 communicates with a vacuum conduit 22, which is in the form of a flexible hose. The vacuum conduit 22 passes through the continuous sidewall 26 of the canister 11 and has a collection end 24 positioned tangentially along an inner surface 25 of the continuous sidewall 26. This tangential position creates cyclonic flow within the collection chamber 15, thereby generating centrifugal forces that cause larger particles to be thrown against the inner surface 25 of the continuous sidewall 26 before dropping downwards to the bottom of the collection chamber 15. Drawn-in air and smaller particles then proceed through the partition filter 28 and into the primary filter 31. The primary filter 31 separates the drawn-in air from smaller particles and the drawn-in air then proceeds through the outlet conduit 47 and into the venturi housing 65 of the venturi vacuum generator 61. The venturi vacuum generator 61 is powered by compressed or pressurized air that is readily available in most manufacturing facilities. Pressurized air and the drawn-in air may then exit the venturi housing 65 through an exhaust outlet 72, which connects to a muffler 73 and/or a diffuser 74. As noted above, the muffler 73 and diffuser 74 effectively attenuate sound generated by the vacuum 10 and therefore the vacuum 10 is not a significant contributor to noise levels. Also, the diffuser 74 reduces the velocity of the exhaust flow and disperses the exhaust flow so that the exhaust flow will not blow metal particles around that have yet to be collected through the vacuum conduit 22. The strap 12 may be replaced by a shoulder strap.

Thus, the venturi vacuum generator 61 is disposed downstream of the primary filter 31 that is disposed in the canister 11 and downstream from the collection chamber 15. Disposing the venturi vacuum generator 61 downstream of the primary filter 31 provides for longer filter life because pressurized air is not pushed through the filter, but rather, entrained air is pulled through the primary filter 31. Further, the flow of pressurized air does not pass through the primary filter 31. Instead, the pressurized air enters the venturi housing 65 and is immediately directed out through the muffler 73 and diffuser 74, which provides for quiet operation of the vacuum 10.

While only certain embodiments have been set forth, alternatives and modifications will be apparent from the above description to those skilled in the art. These and other alternatives are considered equivalents and within the spirit and scope of this disclosure and the appended claims.

What is claimed:

1. A vacuum cleaner for removing particles entrained in air in a workspace, comprising:
    a canister including a collection end, a filter end and a continuous sidewall connecting the collection end to the filter end, the continuous sidewall having an inner circumferential surface continuously connected to a partition wall, the partition wall including an opening filled by a partition filter, the partition wall and the partition filter defining a partition assembly dividing the canister into a collection chamber disposed between the partition assembly and the collection end and a filter chamber disposed between the partition assembly and the filter end, wherein the partition filter and partition wall opening are coplanar with the partition wall extending to the sidewall;

the canister coupled to a vacuum conduit having a vacuum conduit inlet end fluidly communicating with the air in the workspace and a collection end;

the canister connected to an outlet conduit having a filter end connected to the filter chamber and a venturi end connected to a venturi housing;

a partition flange provided independent of the partition wall, the partition flange including a base with a lip extending from the base and away from the partition assembly, the lip defining a central opening in fluid communication with the opening of the partition wall;

a tube coupled to the partition flange and extending axially from the partition assembly through the central opening of the lip and into the filter chamber;

the filter chamber accommodating a primary air filter configured to remove particles from an air stream, the primary air filter extending from a distal cover at a first axial end of the primary air filter to a receiving flange at a second axial end of the primary air filter opposite the first axial end, the primary air filter further having a central wall extending from the distal cover to the receiving flange and receiving at least a portion of the tube inside the central wall, wherein the lip of the partition flange extends into the central wall, and wherein the central wall of the receiving flange receives the tube and sealably engages the lip of the partition flange; and the venturi housing providing communication among the venturi end of the outlet conduit, a pressurized air source, and an exhaust.

2. The vacuum cleaner of claim 1 wherein a filter end cap is detachably coupled to the filter end of the canister, and the primary filter is sized so that the distal cover engages the filter end cap thereby to bias the receiving flange against the partition flange.

3. The vacuum cleaner of claim 1 wherein the venturi housing includes a filtered air inlet connected to the venturi end of the outlet conduit, a pressurized air inlet connected to the pressurized air source and an exhaust outlet connected to the exhaust, the venturi housing further including a deflecting wall for directing pressurized air away from the filtered air inlet and towards the exhaust outlet.

4. The vacuum cleaner of claim 1 wherein the collection end of the canister is open and detachably connected to a collection end cap that encloses the collection end of the canister.

5. The vacuum cleaner of claim 1 wherein the venturi housing further includes an air shut-off valve for isolating the pressurized air source from the exhaust.

6. The vacuum cleaner of claim 1 wherein the primary filter is a HEPA filter.

7. The vacuum cleaner of claim 1 wherein the partition filter is a screen.

8. The vacuum cleaner of claim 1 wherein the vacuum conduit passes through the continuous sidewall of the canister with the collection end of the vacuum conduit directed at the inner circumferential surface of the continuous sidewall of the collection chamber so that the collection end of the vacuum conduit directs air and particles drawn in through the vacuum conduit circumferentially along the inner circumferential surface of the continuous sidewall.

9. The vacuum cleaner of claim 1 wherein the exhaust includes a muffler and a diffuser.

10. A hand-held pneumatic HEPA vacuum cleaner for removing particles entrained in air in a workspace, comprising:

a canister including a collection end, a filter end and a continuous sidewall connecting the collection end to the filter end, the continuous sidewall having an inner circumferential surface continuously connected to a partition wall, the partition wall including an opening filled by a partition filter, the partition wall and the partition filter defining a partition assembly dividing the canister into a collection chamber disposed between the partition assembly and the collection end and a filter chamber disposed between the partition assembly and the filter end, wherein the partition filter and partition wall opening are coplanar with the partition wall extending to the sidewall;

the canister coupled to a vacuum conduit having a vacuum conduit inlet end fluidly communicating with the air in the workspace and a collection end;

the canister connected to an outlet conduit having a filter end connected to the filter chamber and a venturi end connected to a venturi vacuum generator;

a partition flange provided independent of the partition wall, the partition flange including a base with a lip extending from the base and away from the partition assembly, the lip defining a central opening in fluid communication with the opening of the partition wall;

a tube coupled to the partition flange and extending axially from the partition assembly through the central opening and into the filter chamber;

the filter chamber accommodating a HEPA filter, the HEPA filter extending from a distal cover at a first axial end of the HEPA filter to a receiving flange at a second axial end of the HEPA filter opposite the first axial end, the HEPA filter further having a central wall extending from the distal cover to the receiving flange and receiving at least a portion of the tube inside the central wall, wherein the lip of the partition flange extends into the central wall, and wherein the central wall of the receiving flange receives the tube and sealably engages the lip of the partition flange; and the venturi vacuum generator including a venturi housing having a filtered air inlet connected to the venturi end of the outlet conduit, a pressurized air inlet connecting the venturi housing to a pressurized air source, and an exhaust outlet in communication with both the filtered air inlet and the pressurized air inlet.

11. The vacuum cleaner of claim 10 wherein a filter end cap is detachably coupled to the filter end of the canister, and the HEPA filter is sized so that the distal cover engages the filter end cap thereby to bias the receiving flange against the partition flange.

12. The vacuum cleaner of claim 10 wherein the pressurized air inlet is disposed between the filtered air inlet and the exhaust outlet, the venturi housing further including a deflector for directing pressurized air away from the filtered air inlet and towards the exhaust outlet.

13. The vacuum cleaner of claim 10 wherein the collection end of the canister is open and detachably connected to a collection end cap that encloses the collection end of the canister.

14. The vacuum cleaner of claim 10 wherein the venturi housing further includes an air shut-off valve for isolating the pressurized air source from the exhaust.

15. The vacuum cleaner of claim 10 wherein the partition filter is a screen.

16. The vacuum cleaner of claim 10 wherein the vacuum conduit passes through the continuous sidewall of the canister with the collection end of the vacuum conduit directed at the inner circumferential surface of the continuous sidewall of the collection chamber so that the collection end of the vacuum conduit directs air and particles drawn in through the vacuum conduit circumferentially along the inner circumferential surface of the continuous sidewall to create cyclonic flow in the collection chamber.

17. The vacuum cleaner of claim 10 wherein the exhaust includes a muffler and a diffuser.

18. The vacuum cleaner of claim 2, wherein the primary air filter further includes a rib projecting from the distal cover and sized to engage the filter end cap when attached to the filter end of the canister.

19. The vacuum cleaner of claim 11, wherein the HEPA filter further includes a rib projecting from the distal cover and sized to engage the filter end cap when attached to the filter end of the canister.

\* \* \* \* \*